June 1, 1954 H. H. GORRIE ET AL 2,679,829
CONTROL APPARATUS
Filed Sept. 2, 1948 8 Sheets-Sheet 1

INVENTORS
HARVARD H. GORRIE
AND JACK F. SHANNON
BY
Raymond D. Jenkins
ATTORNEY

INVENTORS
HARVARD H. GORRIE
AND JACK F. SHANNON
BY Raymond D. Junkins
ATTORNEY

June 1, 1954

H. H. GORRIE ET AL 2,679,829

CONTROL APPARATUS

Filed Sept. 2, 1948

*INVENTOR.*
HARVARD H. GORRIE
AND JACK F. SHANNON
BY
*ATTORNEY*

June 1, 1954 H. H. GORRIE ET AL 2,679,829
CONTROL APPARATUS
Filed Sept. 2, 1948 8 Sheets-Sheet 4

*INVENTORS*
HARVARD H. GORRIE
AND JACK F. SHANNON
BY
*ATTORNEY*

INVENTORS
HARVARD H. GORRIE
AND JACK F. SHANNON
BY Raymond D. Jenkins
ATTORNEY

June 1, 1954 — H. H. GORRIE ET AL — 2,679,829
CONTROL APPARATUS

Filed Sept. 2, 1948 — 8 Sheets-Sheet 6

INVENTORS
HARVARD H. GORRIE
AND JACK F. SHANNON
BY
*Raymond W. Jenkins*
ATTORNEY June 1, 1954

H. H. GORRIE ET AL 2,679,829

CONTROL APPARATUS

Filed Sept. 2, 1948

INVENTORS
HARVARD H. GORRIE
AND
BY  JACK F. SHANNON

Raymond W. Jinkins
ATTORNEY

*INVENTOR.*
HARVARD H GORRIE
AND JACK F. SHANNON
BY
*ATTORNEY*

Patented June 1, 1954

2,679,829

UNITED STATES PATENT OFFICE 2,679,829

CONTROL APPARATUS

Harvard H. Gorrie, Cleveland Heights, and Jack F. Shannon, Euclid, Ohio, assignors to Bailey Meter Company, a corporation of Delaware Application September 2, 1948, Serial No. 47,516

16 Claims. (Cl. 121—41)

This invention relates to regulating mechanisms, and more particularly to mechanisms which operate to position a control device in response to changes in a loading pressure.

It is frequently necessary that a regulating means be provided for controlling the operation of a control element so as to maintain a condition such as temperature, pressure, fluid level, rate of flow, etc., at some predetermined value. Such regulating means may include a device subjected to a loading pressure varying with the value of the condition and operating on changes in the pressure to position the control element. Adjustable means are desirably provided so that the regulating means may be removed from the loading pressure and placed under manual control whereby the condition may be caused to vary as desired. The type of control apparatus employed will differ somewhat with the control function to be performed; for instance, the flow of fluid may be controlled in one case by a valve connected to a diaphragm which is subjected on only one side to a control pressure, and, in another case, the flow may be controlled by an element connected to a piston which is subjected at its opposite ends to pressures varying with the condition. The regulating means should be adapted for use with the different types of control apparatus, and should be changeable easily to manual or automatic operation regardless of the type of apparatus controlled.

An object of our invention is to provide an improved regulating mechanism. Another object is to provide an improved mechanism for determining a control pressure in response to changes in a condition. Still another object is to provide a mechanism which is adjustable for operation automatically or manually to determine a control pressure. Yet another object is to provide a regulating mechanism which is adapted for use with different types of control elements in performing a control function. Another object is to provide a mechanism for controlling automatically or manually the operation of a control element, and having improved means for locking the control element in any position desired. Another object is to provide an improved mechanism operating in response to a loading pressure for producing a control motion, the mechanism being easily adjustable for varying the relationship between the loading pressure and the motion obtained, both as to characteristic and amount.

A principal object of our invention is to provide fluid pressure responsive servo-motors arranged to take into account the capacity, range, leakage, flow characteristics and other variables of the valves, dampers, and the like devices which the servo-motor positions and to produce a desired relationship between loading pressure and rate of flow of the fluid, or rate of change of the variable, being controlled. To easily accommodate a standard regulating mechanism to valves or dampers of undesirable characteristics and compensate therefor in the positioning of the valve or damper. Furthermore, to provide the possibility of changing the valve or regulator characteristic on an operating installation, and finally to take into account the characteristics of a plurality of regulators and correlate them to produce an integrated control system of a process, or specifically in the proportioning of a plurality of flowing fluids in desirable degree and manner.

There is shown in the accompanying drawings a preferred form of our regulating mechanism and different arrangements of the mechanism for performing control functions.

Figure 1:
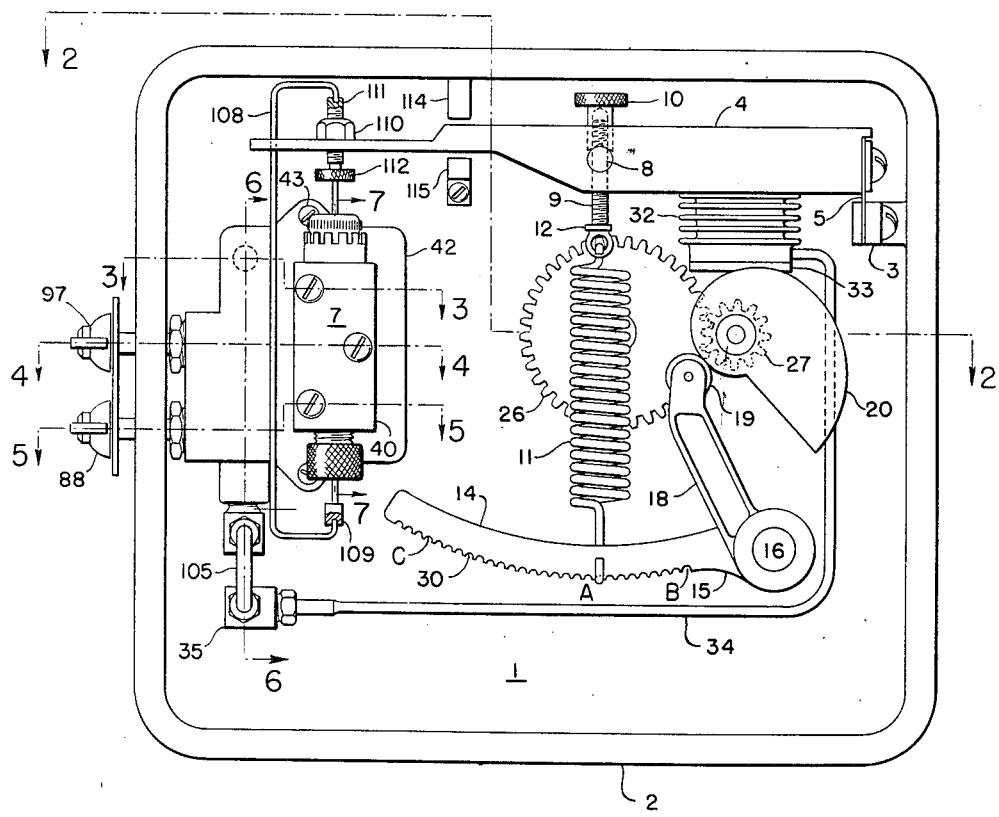
Fig. 1 is a front elevational view of our improved regulating mechanism with the front cover removed.
Figure 4:
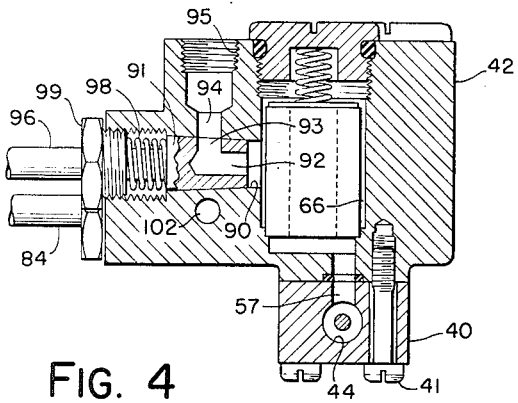
Figure 3:
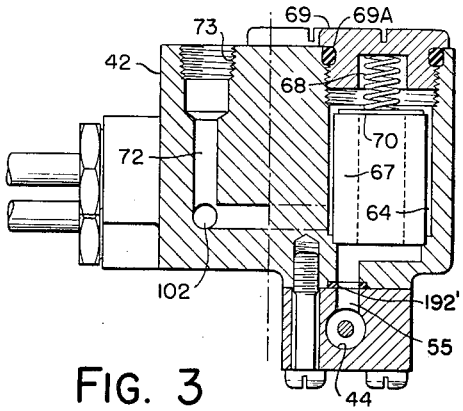
Figure 5:
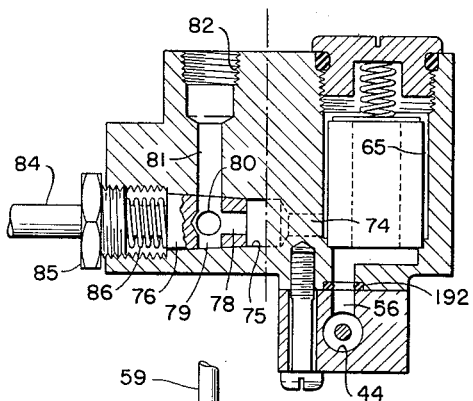

Figs. 3, 4 and 5 are enlarged horizontal sectional views taken on the planes of the lines 3—3, 4—4 and 5—5 of Fig. 1.

Figure 6:
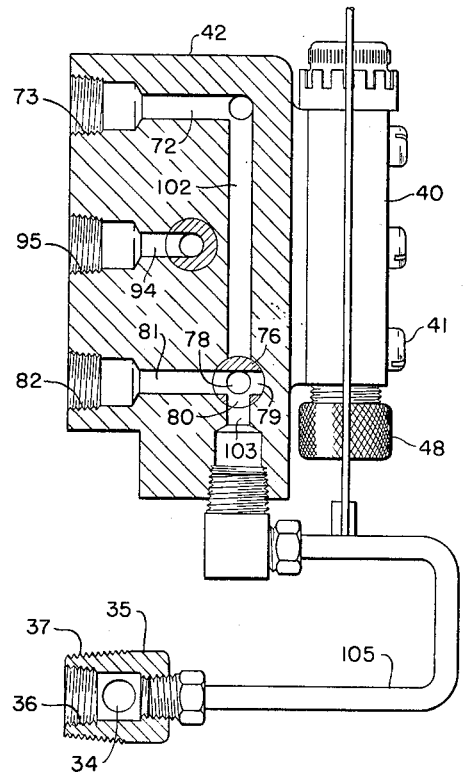
Figure 7:
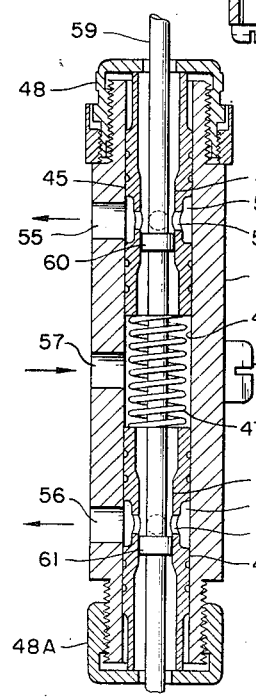

Figs. 6 and 7 are enlarged vertical sectional views taken on the planes of the lines 6—6 and 7—7 of Fig. 1.

Figure 7A:
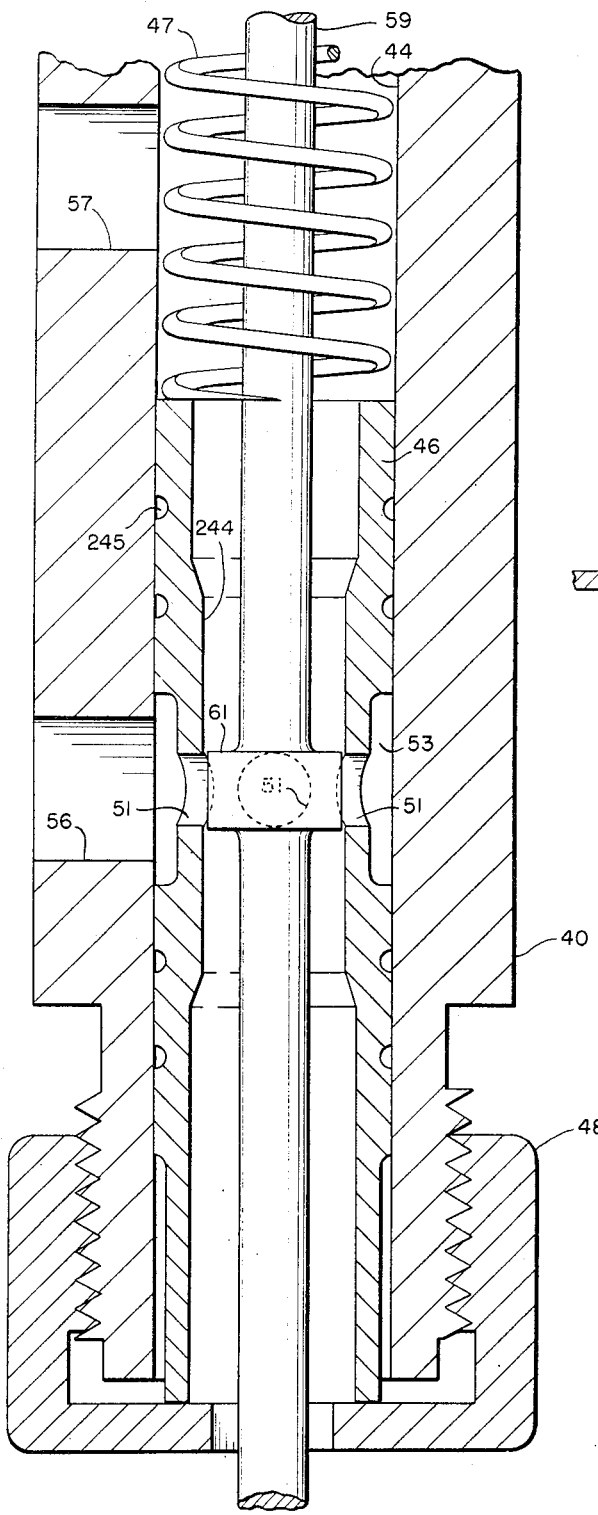

Fig. 7A is an enlarged sectional elevation of the lower portion of the pilot valve of Fig. 7.

Figure 8:
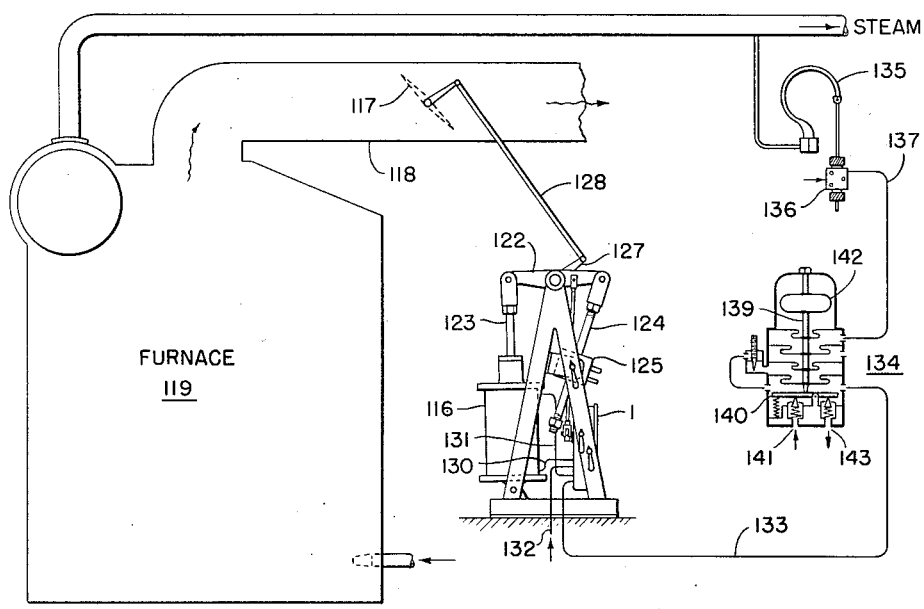
Figure 9:
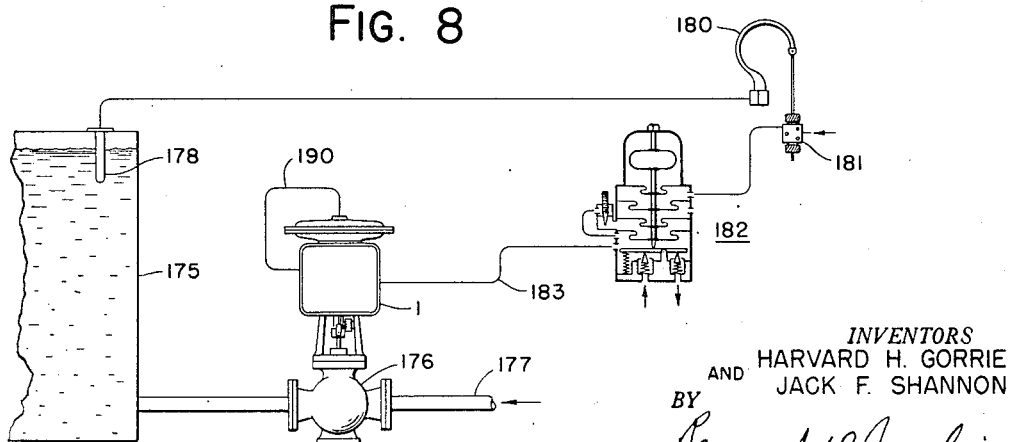

Figs. 8 and 9 are schematic diagrams of different control systems having our improved regulating mechanism incorporated therein.

Figures 10, 11:
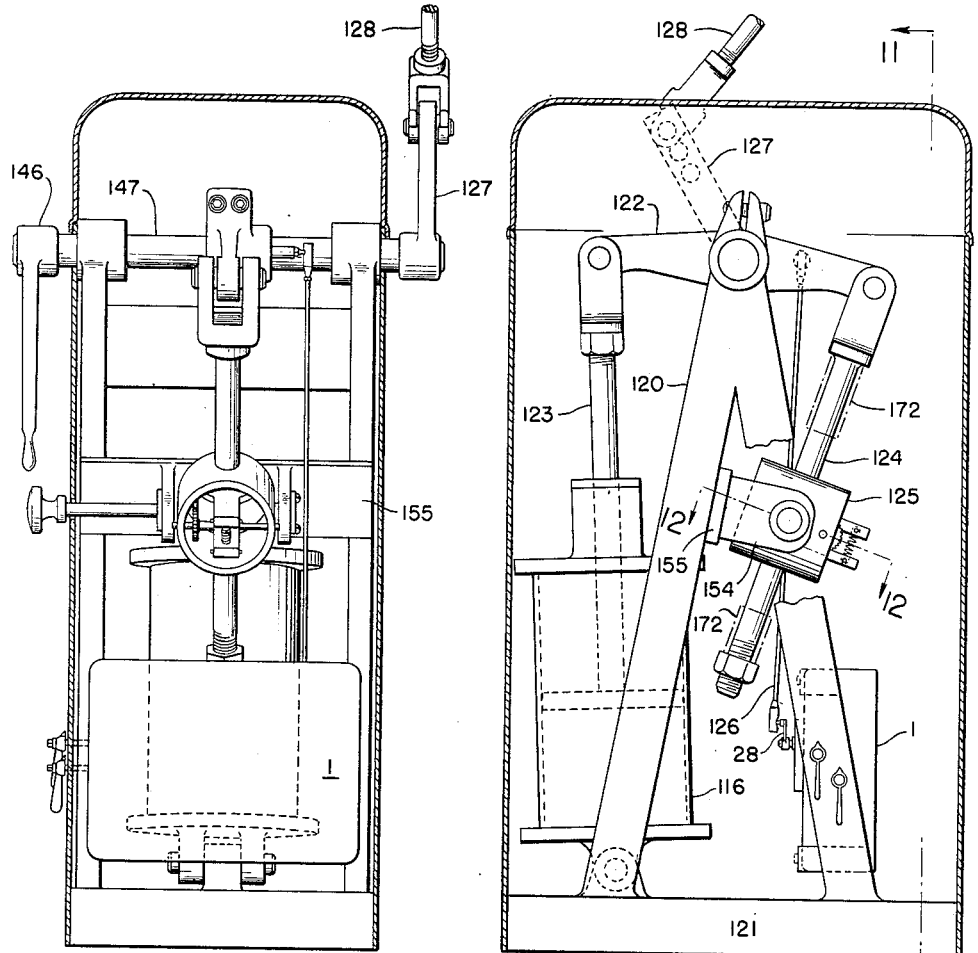

Fig. 10 is an enlarged elevational view of the control mechanism included in the system of Fig. 8.

Fig. 11 is an elevational view of the control mechanism, taken on the plane of the line 11—11 of Fig. 10.

Figure 12:
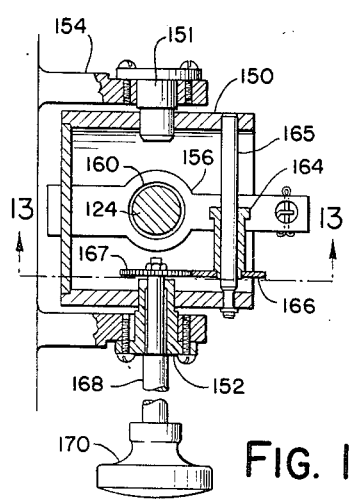

Fig. 12 is an enlarged sectional view taken on the plane of the line 12—12 of Fig. 10.

Figure 13:
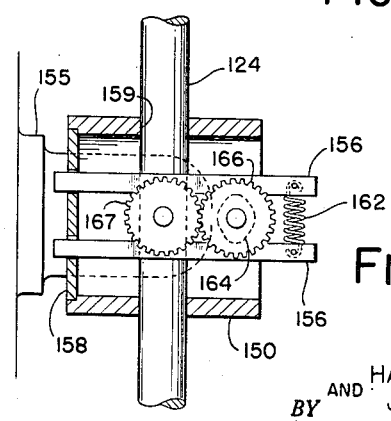

Fig. 13 is a sectional view taken on the plane of the line 13—13 of Fig. 12.

Figure 14:
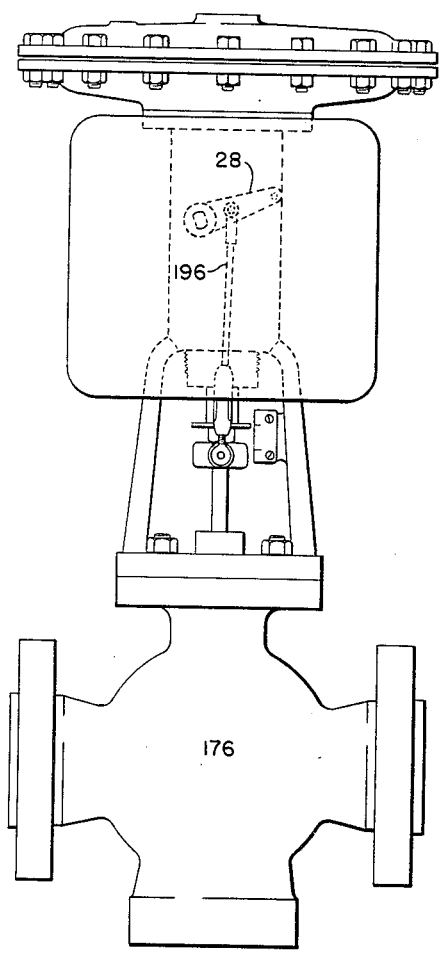

Fig. 14 is an enlarged elevational view of the control mechanism included in the system of Fig. 9.

Figure 15:
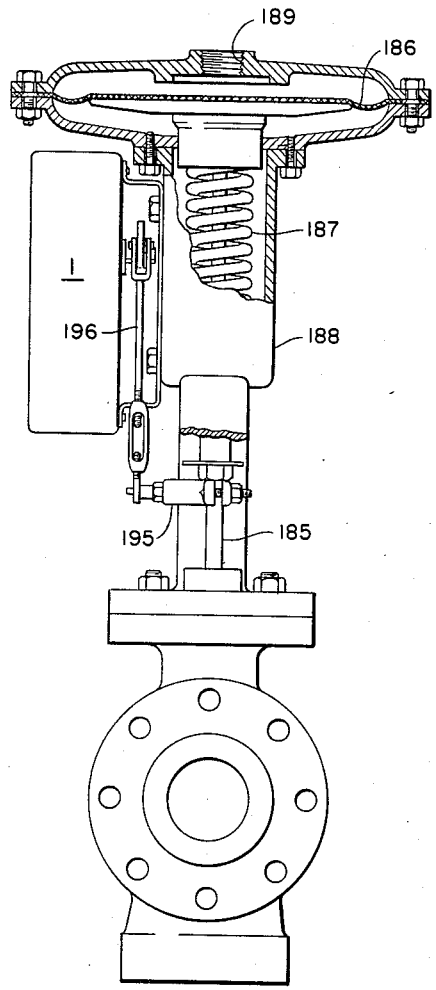

Fig. 15 is a side elevational view of the control mechanism of Fig. 14.

Figure 16:
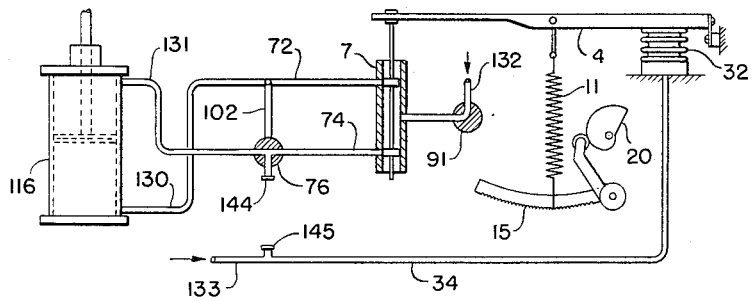

Fig. 16 is a schematic diagram showing our regulator connected to operate the control mechanism of Fig. 10 automatically.

Figure 17:
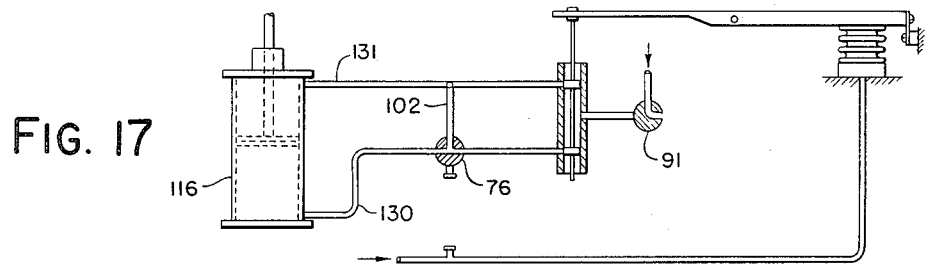

Fig. 17 is a schematic diagram similar to Fig. 16 but showing adjustments for taking the control mechanism from the regulator and adapting it for manual operation.

Figure 18:
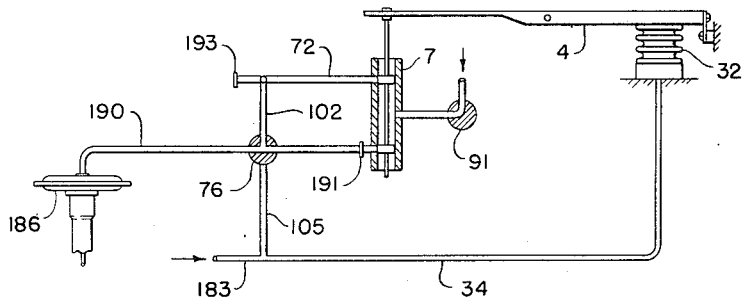

Fig. 18 is a schematic diagram showing the regulator connected to operate the control mechanism of Fig. 14 automatically.

Figure 19:
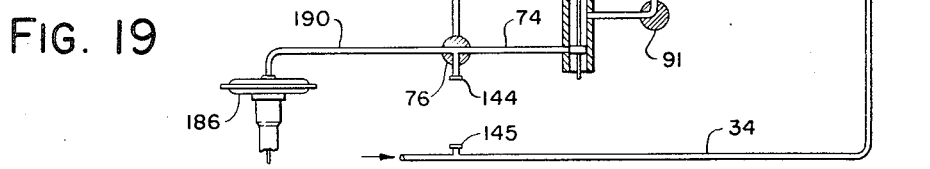

Fig. 19 is a diagram like that of Fig. 17 but showing the regulator connected to reverse the operation of the control means.

Figure 20:
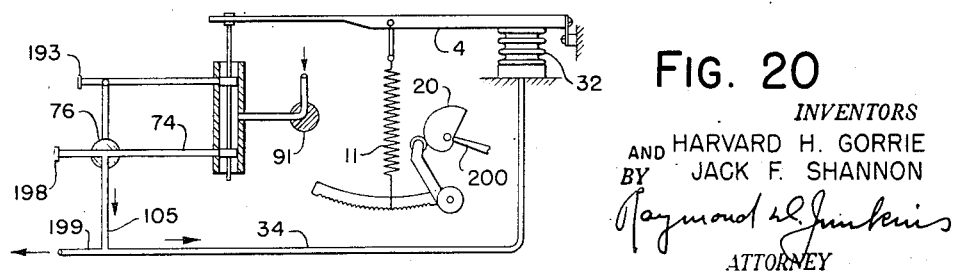

Fig. 20 is a schematic diagram showing the regulator arranged for adjustment manually or by some variable to determine the control pressure.

Figure 21:
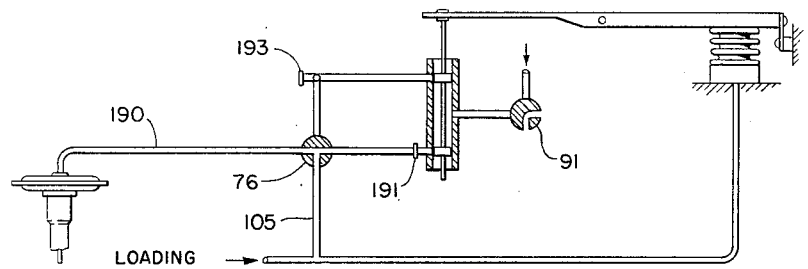

Fig. 21 is a schematic diagram showing the regulator adjusted for subjecting the control mechanism to the loading pressure.

Figure 22:
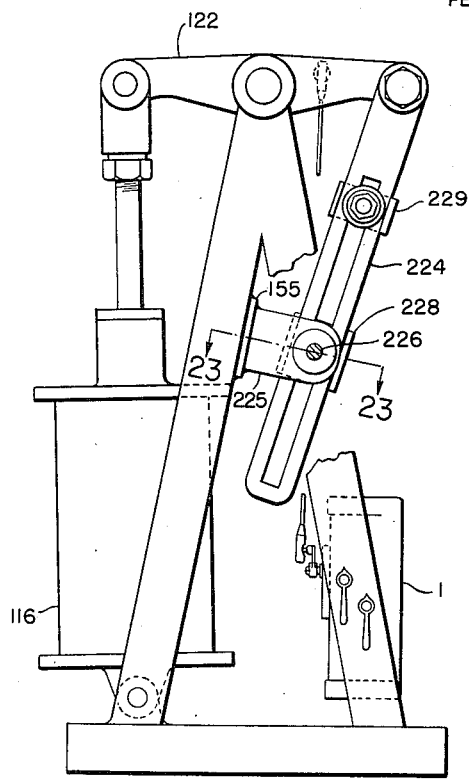

Fig. 22 is an elevation, partially in section of a control mechanism having hand locking means.

Figure 23:
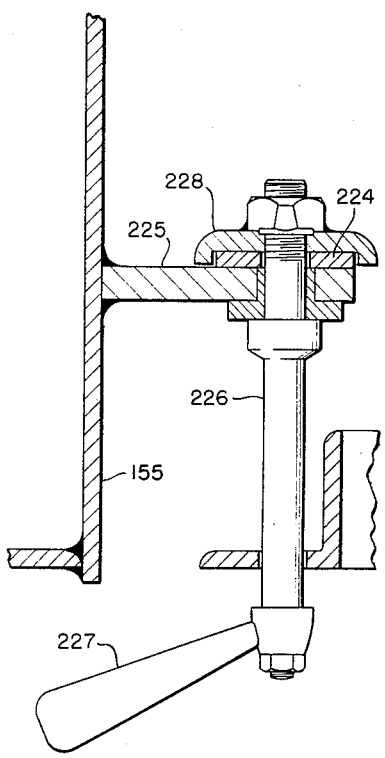

Fig. 23 is a section of Fig. 22 along the line 23—23.

Figure 2:
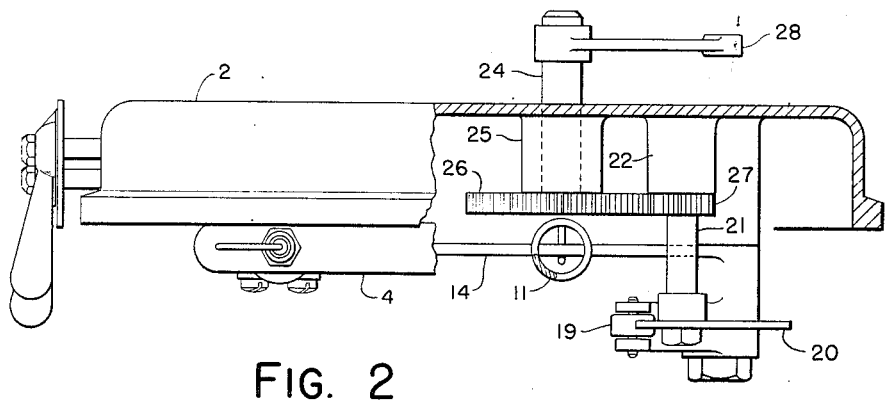
Fig. 2 is a view of the regulating mechanism taken substantially on the planes of the line 2—2 of Fig. 1.

Referring to the drawings, and more particularly to Figs. 1 to 7A, it will be noted that there is shown a regulating mechanism or positioner, generally designated 1, including a casing 2 having a boss portion 3 to which one end of a beam 4 is pivotally connected by a flexible element 5. The other end of the beam is connected to position a pilot valve 7 which will be described shortly in detail. Pivotally supported by the beam at a point approximately midway between its ends is a member 8 having an opening through which a bolt 9 extends for threaded engagement with a thumb nut 10 resting upon the member 8. A coiled spring 11 is attached at one end to an eye piece 12 on the bolt, and is hooked at its other end to an arm 14 of a bell crank 15 pivotally supported at 16 by the casing 2. An arm 18 of the bell crank carries a roller 19 which engages a cam 20 removably fixed, as shown in Fig. 2, to a shaft 21, rotatably supported by a boss 22 formed integral with the casing. Another shaft 24 extends through an opening in a boss 25 on the casing and carries a gear 26 meshing with a pinion gear 27 fixed to the shaft 21. Attached to the shaft 24 at the rear of the casing is a crank 28 adapted to be actuated by means to be described for rotating the gear 26 in one direction or the other.

When the gear 26 is rotated in a clockwise direction as viewed in Fig. 1, the gear 27 is rotated in a counterclockwise direction. The cam 20 turns with the gear 27 and swings the bell crank about its pivot 16 in a direction to increase the tension of the spring 11. A rotation of the gear 26 in a counterclockwise direction results in a turning of the cam to permit the bell crank to swing in a direction so that the spring tension is decreased. The loading of the spring for predetermined angular movements of the bell crank may be varied, as desired, by hooking the lower end of the spring to the arm 14 at different points along its length. To prevent the spring from slipping along the arm, there are provided notches 30 for receiving the hooked end of the spring.

The arrangement provides a simple range adjustment so that full controlled regulator motion can be obtained with one half normal loading pressure change in bellows 32 or half motion for full loading pressure change. With the spring 11 approximately vertical as shown in Fig. 1 the lower end is at location A and normal rotation of the cam will increase the spring tension to balance a loading pressure of from 5 to 25 p. s. i. for example. With the spring moved in toward pivot 16 to location B, normal rotation of the cam will only increase the spring tension enough to balance a 10 p. s. i. change or from 5 to 15 p. s. i., while location C will change the spring tension enough to balance a pressure change of 5 to 25 p. s. i. with only half rotation of the cam 20. The knurled nut 10 is used to set the starting point at 5 p. s. i. loading pressure for zero travel of cam 20.

Arranged between the pivot 5 of the beam 4 and the spring support 8 is a bellows 32 acting against the lower side of the beam and supported by a projecting portion 33 formed integral with the casing 2. A conduit 34 communicates with the interior of the bellows and is connected to a coupling 35 having, as shown in Fig. 6, an opening 36 adapted to receive a suitable fluid supply connection which may be pipe 133 of Fig. 8 or pipe 183 of Fig. 9. The coupling, as shown herein, is provided with a portion 37 which may be threaded into an opening in the rear wall of the casing for holding it in place.

The pilot valve 7 comprises, as shown in Figs. 3 to 7A, a valve block 40 connected, as by bolts 41, to a block 42 which is attached, as shown in Fig. 1, by bolts 43 to the rear wall of the casing. Formed in the valve block 40, normal to the longitudinal axis of the beam 4, is a bore 44 containing sleeve shaped members 45 and 46 which are urged by a spring 47 into engagement with caps 48 and 48A threadedly connected to the block at the ends of the bore. Formed in the sleeve members 45, 46 are circular ports 50 and 51 opening into annular grooves 52 and 53 in the outer peripheries of the members. Opening through the valve block into communication with the grooves 52, 53 are ports 55 and 56, and opening through the valve block into communication with the bore 44 at a point between the sleeve members is a port 57. Extending through the sleeve members is a valve stem 59 carrying lands 60 and 61 slideably engaging the inner walls of the sleeve members and cooperating with the ports 50 and 51, respectively, for controlling communication between the ports and the spaces within the sleeve members at opposite sides of the lands. The valve stem 59 extends through openings in the caps 48 and 48A with sufficient clearance to provide a venting of fluid to the atmosphere.

The ports 55, 56 and 57 communicate, as shown in Figs. 3, 5 and 4 respectively, with the ends of bores 64, 65 and 66 in the block 42. Arranged in each of these bores is a sleeve shaped filter 67 which is held in engagement with a shoulder at one end by a spring 68 acting between a removable plug 69 and a plate 70 covering the other end of the filter. Formed in the block 42 (Fig. 3) is a passage 72 communicating at one end with the bore 64 and terminating at its other end in an enlarged threaded opening 73 adapted to receive a fluid connection.

The bore 65 is connected by a passage 74 to the inner end of a tapered bore 75 in which a valve member 76 is rotatably received. The inner portion of the valve member is provided with an axial passage 78 which communicates at the midportion of the valve member with a diametrical passage 79 and a radial passage 80 at right angles to the passage 79. A passage 81 in the block 42 opens at one end with the bore 75 to communicate with the passage 79 or 80, and terminates at its other end in an enlarged threaded opening 82 adapted to receive a fluid connection. The valve 76 is provided with a stem 84 extending through a plug 85, and a spring 86 acts between the plug and the valve for holding the latter in place within the bore 75. The valve stem 84 extends through an opening in the casing 2, as shown in Fig. 1, and has an operating handle 88 attached thereto at the exterior of the casing.

As shown in Fig. 4, a tapered bore 90 opens into the bore 66 and contains a valve member 91 having an axial passage 92 communicating with a radial passage 93. A passage 94 in the block 42 is adapted to communicate at one end with the passage 93, and terminates at its other end in an enlarged threaded opening 95. The valve member 91 is provided with a stem 96 extending through an opening in the casing and carrying an operating handle 97 at the exterior of the casing. A spring 98 acts between a plug 99 and the valve member 91 for holding the latter within the bore 90.

The valve member 91 is provided, as will be soon pointed out, for controlling the supply of pressure fluid from the passage 94 through the filter in the bore 66, and the port 57 to the interior of the sleeve members in the pilot valve. When the stem 59 of the pilot valve is in the position shown in Fig. 7, the pressure fluid passes from the interior of the sleeve members through the port 56, the filter in the bore 65, and the passage 74 to the axial passage 78 in the valve member 76. The port 55 of the pilot valve is connected at this time through the upper portion of the sleeve member 45 and the clearance around the valve stem to atmosphere for venting the passage 72 in Fig. 3. If the pilot valve is moved to position the lands above the ports 50 and 51, pressure fluid will be supplied through the port 55 to the passage 72, and pressure will be vented from the axial passage of the valve member 76 through the port 56. The lands 60 and 61 will normally be moved in one direction or the other to uncover the ports 50 and 51 only a small amount to pressure fluid supply and exhaust.

As shown in Fig. 6, a passage 102 is provided in the block 42 for connecting the passage 72 in communication with the bore for the valve 76 so that it may communicate with the passages 79 or 80 when the valve is rotated to the proper positions. Another passage 103 opens into the bore for the valve 76 and is connected by a conduit 105 in communication with the interior of the coupling 35. For certain types of control, it is necessary that there be no communication between the valve 76 and the coupling 35. At this time the conduit 105 may be removed, and the openings in the coupling 35 and at the lower end of the passage 103 may be closed by suitable plugs.

The assembly provides an extremely compact arrangement with a minimum of external connections and piping. The three replaceable cartridge type filters 67 are held in place by plugs 69 pressure-sealed to block 42 by O-ring packings 69A. The three passages 55, 56 and 57 of block 40 are pressure-sealed to matching passages in block 42 by O-ring packings in recesses 192 wherein may be located timing or speed orifices regulating speed of damper or valve movement.

For connecting the stem 59 of the pilot valve to the beam 4 for positioning thereby, there is provided a spring rod 108 bent as shown in Fig. 1 and having its lower end fitting loosely in a recess formed in an enlargement 109 of the lower end of the valve stem. Fixed to the beam is a nut 110, and a bolt 111 is threaded through the nut and is provided at its lower end with a head 112 having a flat surface which is engageable by the upper end of the valve stem. The rod 108 extends through an opening in the beam 4 and has its upper end fitting loosely in a recess formed in the upper end of the bolt 111. A spring action is provided by the rod 108 for yieldingly supporting the valve stem with its upper end in engagement with the flat surface on the head 112. It will be appreciated that this arrangement permits a mounting of the pivoted beam out of alignment with the pilot valve without affecting the operation of the latter. With the rod extending through an opening in the beam, it is prevented from swinging about its ends into positions where it might obstruct the operation of the mechanism. The rod 108 may be easily sprung to release the pilot valve for removal, if desired.

Referring now particularly to Fig. 7A it will be noted that this is an enlargement of the lower half of Fig. 7 and is a vertical section to about 6 times actual size of the lower half of pilot valve 7. The arrangement provides an improved pilot valve particularly adapted for the establishment of pneumatic loading pressures useful in servomotors (see Figs. 8, 9, 14 and 15) for positioning regulating devices such as valves, dampers and the like. Through the use of air as a pressure fluid the waste or bleed may go to the atmosphere and it is unnecessary to provide drains or sumps as is the case when oil or other liquid might be used as the pressure fluid.

The block 40 has an axial bore 44 in which are two sleeve members 45, 46 which may be identical but are inverted, the one relative to the other, in the bore in which they are slidably fitted. The overall bearing length of sleeve 46 (for example) in bore 44, is considerable, compared to the length of the inner bore 244 of the sleeve, and is provided not only with fairly close clearance with bore 44 but, on each side of groove 53, has two or more cannelures to serve as a labyrinth minimizing the possibility of air leaking between the sleeve 46 and bore 44. The cannelures further provide a depository for a small amount of grease with which the outer surface of sleeve 46 may be lightly coated at assembly so that the sleeve will not freeze in bore 44.

The length of the accurately machined bore 244 need only be about three times the length (axially) of the cylindrical land 61 to provide for the land in a position just clear of ports 51 either above or below the ports. In the present assembly the length of land 61 is $\frac{3}{32}$ inch so that the length of the accurately bored and lapped section 244 need only be about ¼ inch, thus considerably decreasing the time and cost of a similar bore coextensive in length with the sleeve. The truss-like shape of longitudinal section through the sleeve, provided by the annular recess 53 between the bearing areas which engage bore 44, facilitates full bearing of the areas in bore 44 without distortion of bore 244. Furthermore, the relatively short length of accurate bores 244, 244', compared to the distance spacing said bores in main bore 44, minimizes trouble due to misalignment of bore 244 with bore 244' through distortion of sleeve 45 or sleeve 46 in manufacture, storage, or when assembled in bore 44, or through lack of concentricity of bore 244 or 244' with the exterior of sleeve 45 or 46, or from lack of axial parallelism of the cylindrical surfaces of lands 60 and 61.

All of these features of construction of sleeves 45, 46, bore 44, and stem 59 with its lands 60, 61, result in an assembly wherein the sleeves and stem may be readily assembled and disassembled, for inspection or cleaning, without fear of increasing leakage or introducing friction, or of other troubles. When assembled for operation the clearance of land 60 in bore 244' and the clearance of land 61 in bore 244 is minute, thus minimizing fluid leakage past the lands, as compared to prior structures having relatively longer bores 244, 244' and closer spaced lands. Furthermore, these advantages are obtained with decreased time and expense of manufacture, closer tolerances, inspection rejects, etc.

The lands 60, 61 are preferably of cylindrical shape with sharp cut off corners, positioned relative to four round holes 51 equally spaced around the sleeve 45 or 46. In the present example the length of the land is $\frac{3}{32}$ inch while the diameter of holes 50, 51 is substantially the same; if anything, the diameter of the holes may be very slightly less than the length of land so that at neutral there is a complete overlap of holes 51 by land 61. Even so, there will be a very small leakage of air past the lands 60, 61, to atmosphere, from the supply 57, as well as a very small leakage of air into 55 and 56 from 57 and out of 55 and 56 (past lands 60, 61) to atmosphere. Such leakage is inconsequential so far as power-cost is concerned but serves two useful purposes. Leakage past the lands 60, 61, in bores 244, 244' serves to center the lands and prevent friction against bores 244, 244' by providing a lubricating film of air between the surface of the land and the bore. Slight movement of air into and out of 55, 56 (at neutral) serves to prevent any build-up of pressure in one passage 55, 56 relative to the other when equality is desired and no motion of apparatus controlled by the fluids in 55, 56 is desired.

Prior constructions of this general type have had lands of spherical or football shape, positioned relative to circumferential slots in the surrounding sleeve, but, due to the length of the slot, slight axial off-neutral positioning of the land resulted in rapidly increasing pressure loss through the port, and excessive leakage, particularly if the slot port is made wide for capacity. Such prior constructions usually had a pair of abutting sleeve sections adjacent each land, spaced in some manner to provide the port; thereby doubling the number of sleeve sections to be accurately made and aligned, as compared to our improved construction.

The use of round bored holes 51 as ports, in our improved pilot valve, provides the simplest of manufacturing procedure with wide range in capacity, sensitivity and pressure characteristic. With the construction shown (four ports 51 in Fig. 7A), by increasing the number of ports the capacity for increments of land movement may be increased, and vice versa. By changing the diameter of the ports 51 (with corresponding change in length of land 61) not only may the relation between full axial land travel and full range of pressure to be varied but the characteristic curve shape may be varied. The later effect is apparent because axial movement of a land uncovers an increasing port area until maximum diameter of the port is reached. Inasmuch as the arc of the segment uncovered is less for small holes than for large holes the flow or pressure characteristic will vary with diameter of port holes 51.

Thus it will be seen that by changing the number and/or diameter of the ports and length of land we can attain a desired balance between capacity, sensitivity, motion of the stem 59, and characteristic curve; and accomplish it through the easiest of machining operations, making cylinder sections and drilling round holes.

The lands 60, 61 are integral with pilot stem 59 and Fig. 7 purposely shows the assembly downward from alignment with ports 50, 51 so that the ports will not be covered up. The spacing of the lands is fixed but the stem assembly may be raised or lowered relative to block 40 by knurled screw 112. On the other hand the spacing of the ports as well as the location of both sets of ports axially in bore 44 may be changed by knurled caps 48, 48A, one or both of which may have locking means as shown on 43.

Of course, a capacity change may be made by changing the diameter of bores 244, 244' and of lands 60, 61. In the present example this diameter is $\frac{1}{16}$ inch and with four $\frac{3}{32}$ inch holes and a land length of $\frac{3}{32}$ inch we have found less air leakage with greater capacity and equal or better sensitivity than with prior larger constructions.

Referring again to Figs. 1 and 2 it will be seen that our positioner 1 has a beam 4, pivoted at 5, and loaded by bellows 32 and spring 11 for positioning the pilot stem 59 in pilot valve block 40. Movement of the beam is limited by stops 114, 115 either or both of which may be adjustable. The cam 20 and follower mechanism provides a motion tieback so that the relationship of loading pressure applied to bellows 32 to the position of the controlled object (as represented by position of arm 28) can be modified to give a desired characteristic of loading pressure versus fluid flow through duct 118 Fig. 8, or through valve 176, Fig. 9 (for example), or other variable being controlled by the piston drive or the valve.

Positioners for dictating the movement of piston drives, motor valves, or the like servo-motors are known and usually perform the function of a relay wherein the fluid loading pressure originating at a measuring controller is amplified if necessary to overcome friction, pressure off-balance, viscous fluid effects, or the like, and position a piston or valve in exact proportion to changes in controller output pressure. Our present positioner 1 additionally provides for range or capacity change as well as the introduction (by cam 20) of characteristic correction; whereby we can better take care of matching two or more fluid flows (fuel and air for example) with easier field adjustability.

Figure 1A:
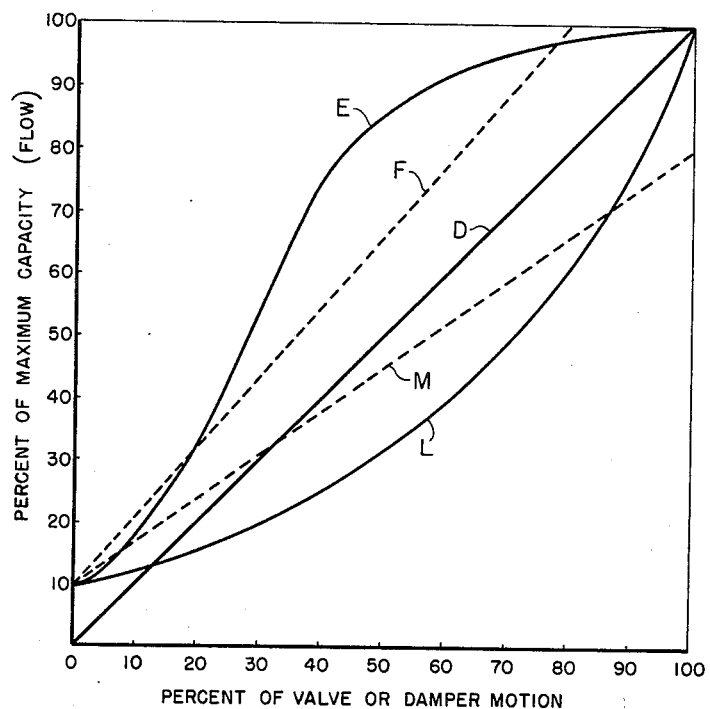
Fig. 1A is a family of graphs in connection with Fig. 1.

If we could assume that the flow versus motion characteristic of the valve 176, or of the damper 117, were a straight line such as D of Fig. 1A, then known positioners having a motion tieback would accept the loading pressure from pipe 177 or pipe 133 and position the valve or damper the desired amount in spite of friction or similar effects.

However, we know from experience that the characteristic curve of a damper 117 may be somewhat like E of Fig. 1A while the valve 176 may have a characteristic like L. From these curves it will be seen that a 10% change of valve position from 80% to 90% means a change in flow of about 17% while a similar change in damper position means a flow change of about 3%; a 10% change of valve position from 20% to 30% means a change in flow of about 5% while a similar change in damper position means a flow change of about 24%. This even on the basis that the maximum capacities of the valve and damper are similar in terms of flow, a condition which rarely obtains.

The shape of the curve E or L may depend upon the shape and number of valve ports, damper louvres, or other variable of design. Furthermore it is frequently found that where a valve or damper is in what is presumed to be a shut off position there may be as much as ten or fifteen percent leakage past the seats. Thus curves E and L have been shown, by way of example, as starting at 10% leakage flow but ending together at same maximum flow.

In designing a process and applying commercial apparatus thereto it is rather infrequent that exactly the desired maximum rate of fluid flow through the valve (or damper) is reached at exactly maximum valve opening position. Frequently the maximum flow capacity of the valve (or damper) falls short or exceeds the desired maximum. Thus the damper curve E (assuming it for the moment to be linear) might take the position F, starting with 10% leakage and reaching maximum flow at 80% motion, while curve L (assumed to be linear) might take the position M, never reaching more than 80% of desired flow for full valve opening.

It is a particular object of our present invention to easily accommodate a universal regulating mechanism or positioner to valves or dampers of perhaps undesirable characteristics and compensate therefor in the positioning of the valve member or damper. Furthermore, to provide the possibility of correcting the valve or damper characteristic on an operating installation, and finally to take into account the characteristics of a plurality of regulators and correlate them to produce an integrated control system of a process, or specifically in the proportioning of a plurality of flowing fluids in desirable degree and manner.

As previously mentioned, change of range is readily accomplished by moving the lower hook of spring 11 from position A to B or C or other position on arm 14; that is to vary the relation between loading pressure range in bellows 32 and cam rotation (damper or valve movement). Three cams are normally furnished, one can be used for linear relation between loading pressure and cam motion, the second where very small motions are desired for a given increment of loading pressure change at the lower end of the loading pressure range and larger motions at the high loading pressure end, while the third reverses this action and produces more motion at the lower end of the loading pressure range. If none of these standard cams give exactly the desired loading pressure versus flow characteristic, they can be easily modified to suit the particular installation.

Referring to Fig. 8 it will be noted that our positioner 1 is shown connected in a system for regulating the operation of a piston in a cylinder 116 to position a damper 117 in the stack 118 of a furnace 119. As shown more clearly in Fig. 10, the regulator 1 is supported by an angle frame 120 which is mounted on a base 121 and pivotally supports a beam 122 at its upper end. One end of the beam is connected to a piston rod 123, and its opposite end is connected to a rod 124 extending through the casing of a manually operated locking mechanism, generally designated 125. A rod 126 is connected at one end to the beam 122 and is connected at its other end to the crank arm 28 of the positioner 1. A crank arm 127 is fixed for swinging movement with the beam 122 and is operatively connected by a link 128 to the damper. The cylinder 116 is pivotally supported at its lower end on the base 121, and its opposite ends are connected by conduits 130 and 131 to the openings 73 and 82, respectively (see Fig. 6), in the block 42 of the positioner. A fluid supply connection 132 communicates with the opening 95 in the block 42, and a conduit 133 is connected to the opening 36 in the coupling 35 and supplies pressure fluid thereto from a relay 134.

A pressure responsive device 135, such as a Bourdon tube, is subjected to the pressure of the steam discharged from the boiler and operates to position a pilot valve 136 which controls the supply of pressure fluid through a conduit 137 to the relay 134. The pressure fluid supplied by the conduit 137 acts on a diaphragm of the relay to force a member 139 against a pivoted beam 140 for unseating a valve controlling a fluid supply connection 141. A spring 142 opposes the downward movement of the member 139 so that an unseating of the supply valve takes place only when the pressure delivered by the conduit 137 overcomes the action of the spring. A valve controlling an exhaust connection 143 is adapted to be unseated by the beam 140 when the action of the spring 142 overcomes the force exerted by the pressure fluid. This relay is disclosed by the Gorrie Patent Re. 21,804, and need not be described further herein. It is sufficient to say that an unbalance of the relay by an increase in the pressure supplied to it results in a continuing increase in the pressure supplied to the conduit 133. An unbalance in the opposite direction results in a continuing decrease in the pressure supplied to the conduit 133. The connections to the pilot valve 136 are such that changes in steam pressure produce corresponding changes in the pressure supplied to the conduit 137. When the relay 134 is balanced, the pressure in the conduit 133 is held constant at the value existing when the balance is reached.

For obtaining an operation of the regulator to position the damper 117 in response to changes in steam pressure, or in response to a loading pressure which may be determined by any variable, the valves 76 and 91 are positioned as shown in Fig. 16. These are the same positions in which the valves are shown in Figs. 4 and 5. With this arrangement, the pressure fluid is supplied from the conduit 132 through the valve 91 to the interior of the pilot valve 7, and the opposite ends of the cylinder 116 are connected to the ends of the pilot valve for communication with fluid supply or exhaust under the control of the lands 60 and 61. It will be noted that the valve 76 also connects the upper end of the cylinder and the lower end of the pilot valve in communication with the passage 103 which is closed at this time by a plug 144. The opening provided in the coupling 35 for the conduit 105 is also closed by a plug 145, the pipe 105 being removed. Pressure fluid supplied by the relay 134 to the conduit 133 is conducted through the conduit 34 to the bellows 32 where it acts to urge the beam 4 in a clockwise direction against the action of the spring 11. A movement of the beam by this pressure results in a positioning of the pilot valve 7 to supply pressure fluid from the upper end of the valve through the conduit 130 to the lower end of the cylinder 116, and to exhaust fluid from the upper end of the cylinder through the conduit 131 and the lower end of the pilot valve to the atmosphere. The piston is then moved upwardly in the cylinder to swing the beam 122 and effect a movement of the damper towards its closed position. As the beam 122 swings about its pivot, the rod 126 acts through the crank arm 28 to rotate the gear 26 in a clockwise direction, as viewed in Fig. 1. This produces a turning of the cam 20 in a counter-clockwise direction to swing the bell crank 15 in a direction to increase the tension of the spring 11. As soon as the increased spring tension moves the beam 4 against the pressure in the bellows 32 and returns the pilot valve to a position at which the forces on the beam are balanced, the piston in the cylinder stops and holds the damper in some new position. If the pressure supplied to the bellows 32 drops as a result of a drop in steam pressure, the beam 4 operates to position the pilot valve for supplying pressure fluid to the upper end of the cylinder and venting its lower end. The piston then moves downwardly to open the damper and to actuate the cam 20 for reducing the tension of the spring 11 until the beam is again balanced. It will be appreciated that the cam may be shaped to give any operating characteristic. The control means may be caused to operate in direct proportion to changes in loading pressure, in proportion to the square or square root of the loading pressure, or in any other manner by merely changing the shape of the cam.

If it is necessary that the piston in the cylinder 116 be actuated opposite to that shown and described for obtaining the desired positioning of a control element, the connections of the conduits 130 and 131 to the ends of the cylinder may be reversed from that shown in Fig. 16. With this change in the system of Fig. 8, the damper 117 would be arranged for closing movement by the downward movement of the piston. In order that the tension of the spring 11 may be varied for balancing the pressures acting on the beam with this arrangement, either the cam 20 must be turned over or the driving connections to the cam must be changed so that its direction of rotation is reversed by movement of the piston.

At times it may be necessary that the automatic regulation of the damper or other control element be discontinued and that manual regulation be made possible. For terminating automatic regulation, the valve 76 is moved to the position shown in Fig. 17 for connecting the opposite ends of the cylinder in communication with each other through the passage 102. It will be appreciated that the pressures at the opposite ends of the cylinder are then equal, and the position may be moved freely therein. The valve 91 is moved to a closed position so that the pressure fluid is not wasted to atmosphere at the ends of the pilot valve. For positioning the damper manually, there is provided, as shown in Fig. 11, an operating lever 146 connected to the shaft 147 upon which the beam 122 is fixed. A rotation of this shaft by the lever effects a positioning of the damper through the crank arm 127 and the connecting link 128. In order that the damper may be held in the position to which it is moved by the lever 146, it is necessary that some locking means be provided. The locking mechanism 125 referred to above, is provided for gripping the rod 124 and holding the parts in the positions to which they are moved by the lever 146.

The locking mechanism 125 includes, as shown in Figs. 10 to 13, a casing 150 rotatably supported by stub shafts 151 and 152 carried by bearing members 154 on a member 155 which is supported by the angle frame 120. Extending longitudinally through the casing 150 are plate members 156 loosely received within openings in and end wall 158. The rod 124 extends through openings 159 in the side walls of the casing, and through openings 160 in the plate members 156. The openings 160 provide a small clearance about the rod so that the plate members may be swung angularly relative to the rod. Attached to the outer ends of the plate members is a spring 162 which tends to pull the ends of the plate members together so that the edges of the openings 160 engage the rod for locking it against longitudinal movement. It will be seen that the upper plate 156 is engageable with the rod to hold it against downward movement, while the lower plate is adapted to hold it against upward movement. For moving the plate members against the action of the spring 162 to release them from the rod, there is provided a cam 164 fixed to a shaft 165 extending between the plate members and rotatably supported by the casing. A gear 166 is fixed to the shaft and meshes with a gear 167 attached to a shaft 168 rotatably supported within an opening in the stud shaft 152. A handle 170 is provided on the shaft 168 for rotating the latter to position the cam 164. It will be noted in Fig. 13 that the cam 164 is shaped to move the plate members to positions releasing them from the rod 124, and, when turned 90°, permits movement of the plate members into locking engagement with the rod.

For limiting the movement of the beam 122, there may be provided sleeve shaped members 172 on the rod 124 at opposite sides of the locking mechanism. The sleeve members are engageable at their inner ends with the casing of the locking mechanism, and at their outer ends with abutment surfaces carried by the rod.

In Figs. 22 and 23 we have shown another form of hand locking arrangement. Positioned by the beam 122 is a slotted bar 224. Passing through the slot is shaft 226 which is supported by a member 225 projecting from the cross web 155 and having a crank arm 227 extending external of the frame members 120. Carried by the shaft 226 is a clamp 228 surrounding three sides of the slotted bar 224 and arranged to clamp the bar 224 between the clamp 228 and the support 225 when the crank arm 227 is turned about 90°. A travel limit 229 is of somewhat similar construction but arranged to be clamped to the slotted bar at any desired position to the end that member 229 will travel downwardly with bar 224 and engage clamp 228 thus limiting travel of the piston in one direction.

Fig. 9 shows our positioner 1 connected in a system which operates in response to changes in temperature of a fluid in a tank 175 for controlling the operation of a valve 176 in a conduit 177 conducting fluid to the tank. An element 178 is subjected to the fluid in the tank and develops a pressure proportional to the temperature for actuating a Bourdon tube 180 which positions a pilot valve 181 controlling the supply of pressure fluid to a relay 182. This relay is like the relay 134 described above and delivers a pressure fluid to a conduit 183 communicating with the coupling 35 of the regulator.

The valve 176 is provided, as shown in Figs. 14 and 15, with a valve stem 185 which is connected to a fluid actuated diaphragm 186. A spring 187 acts between the bottom of a housing 188 and the lower side of the diaphragm for urging the valve either to an open or a closed position depending upon the type of valve used. An opening 189 is provided in the the diaphragm casing for admitting pressure fluid to the upper side of the diaphragm.

Fig. 18 shows one arrangement of our regulator for controlling the supply of pressure fluid to the diaphragm 186. In this case, pressure fluid supplied by the relay 182 to the conduit 183 is delivered through the conduit 34 to the bellows 32. The valve 91 is positioned to supply pressure fluid to the pilot valve 7, and the valve 76 is positioned to connect the upper end of the pilot valve to the diaphragm through the passages 72, 102, valve 76, and a conduit 190. The connection between the valve 76 and the lower end of the pilot valve is shown closed by a plug 191 which may be in the form of a plate receivable, as shown in Fig. 5, in a recess 192 formed in the block 42 at the opening 56. The opening 73 at the outer end of the passage 72 is closed by a plug 193. The conduit 105 may be connected in the system as shown so that pressure may be delivered from the conduit 183 to the diaphragm 186 when the valve 76 is turned 180°.

With the adjustments made as indicated above, it will be appreciated that the pressure above the diaphragm 186 will be obtained only from the upper end of the pilot valve. As the pressure supplied to the bellows 32 increases, the pilot valve is operated to increase the pressure acting on the diaphragm. The valve stem 185 of the valve 176 is shown in Figs. 14 and 15 with a member 195 clamped thereon and connected by a link 196 to the crank arm 28 of the positioner 1. A downward movement of the valve stem by an increase in pressure at the upper side of the diaphragm results in an operation of the crank 28 to effect a turning of the cam 20 in a counterclockwise direction. With the cam 20 mounted as shown in Fig. 1, a counterclockwise rotation, causes the bell crank to be swung in a direction to increase the tension of the spring for balancing the pressure increase in the bellows.

Fig. 19 shows the regulator adjusted to control pressure on the diaphragm from the lower end of the pilot valve. With this arrangement, the valve 76 is turned to the position shown so that the lower end of the pilot valve is connected to the diaphragm through the passage 74, the valve 76, and the conduit 199. The plug 193 prevents the escape of pressure fluid from the upper end of the pilot valve, and the plug 144 prevents the escape of fluid through the radial passage 80 of the valve 76. It will be seen that a decrease in the pressure within the bellows 32 will result in an operation of the pilot valve to increase the pressure supplied to the diaphragm. In order to reduce the tension of the spring 11 for balancing the reduced pressure in the bellows, the cam 20 is reversed from the position shown in Fig. 1. The increase in pressure at the diaphragm resulting from the pressure decrease in the bellows causes a downward movement of the valve stem, and this movement effects a turning of the cam 20 in a counterclockwise direction, as explained above. With the cam reversed from the position shown in Fig. 1, its counterclockwise movement causes the bell crank to swing in a direction for reducing the spring tension.

Fig. 20 shows an arrangement of the regulator for adjustment manually or by some variable to determine a control pressure. The arrangement is like that of Fig. 19 except that a plug 198 is threaded into the opening 82 for preventing the escape of pressure fluid from the regulator through the passage 81. The conduit 105 is now connected to the valve 76 so as to supply pressure fluid to the conduit 34 and to a conduit 199 leading to some control element, such as the diaphragm actuated valve 176. The lower end of the pilot valve is connected through the passage 74 and the valve 76 to the conduit 105 for determining the pressure supplied to the bellows 32 and to the control element. The cam 20 is provided with a lever 200 which may be actuated either manually or by a suitable mechanism operating in response to variations in a condition for changing the position of the cam to vary the tension of the spring 11. As the spring tension is increased, the beam 4 is swung downwardly to operate the pilot valve for increasing the pressure supplied to the bellows and the control element. When the pressure increase in the bellows counteracts the spring tension and returns the pilot valve to a position at which the forces on the beam are balanced, no further change takes place in the pressure delivered. It will be seen that the upper end of the pilot valve may be connected instead for determining the control pressure, but the cam 20 must either be reversed or rotated in the opposite direction to effect the same pressure changes.

In order to obtain an operation of some apparatus, such as the furnace 119 of Fig. 8, to give the desired results, it may be necessary that more than one control element be caused to operate in response to a variable condition. One of the control elements may be adjusted by our positioner when connected as shown in Fig. 16 while another control element may be adjusted when connected as shown in Figs. 18 or 19. The regulators may both be subjected to the same loading pressure, but the devices operated by the pressures delivered from the pilot valves may be more sensitive in one arrangement than in the other. The control element positioned by the more sensitive device may then be operated to do more than its share in regulating the condition. To slow down the more sensitive device, a member having a reduced opening may be arranged in the fluid supply and discharge conduit between the device and the pilot valve. The member may be arranged in the recess 192, Fig. 5, for controlling the flow of fluid between the lower end of the pilot valve and the device, and, if needed, another member may be arranged in a recess 192', Fig. 3, for controlling the flow of fluid between the upper end of the pilot valve and the device. When the regulator is connected for controlling the flow of fluid to both ends of a cylinder, as in Fig. 16, and a throttling beccmes necessary, a flow restricting member must be connected in the flow passages at each end of the pilot valve, otherwise the piston will overtravel in one direction and will fail to operate sufficiently in the opposite direction.

Sometimes it becomes necessary to discontinue temporarily the automatic operation of the regulator in determining a control pressure, and yet it is desirable that the control element be subjected to a pressure which varies with the condition controlled. In this case the positioner may be adjusted as shown in Fig. 21 so that the loading pressure is supplied through the conduit 105 and the valve 76 to the conduit 199 leading to the control element. This arrangement is like that of Fig. 18 except for the position of the valve 76. The plug 191 is put in place to cut off any flow of fluid between the valve 76 and the lower end of the pilot valve, and the plug 193 is installed to cut off the escape of fluid from the upper end of the pilot valve. The valve 91 may be moved to its closed position so that the pilot valve may be dismantled, or the valve 91 may be opened for blowing out the pilot valve to remove any foreign matter that may have collected.

While we have shown in this application a regulating mechanism and several arrangements of the mechanism for positioning a control element, it will be understood that the mechanism may be modified and arranged in other ways without departing from the spirit of the invention and the scope of the appended claims.

Certain features of our invention, disclosed but not claimed herein, are disclosed and claimed in our copending divisional application S. N. 182,512, filed August 31, 1950.

What we claim as new and desire to secure by United States Letters Patent, is:

1. A regulating mechanism including, in combination, a beam pivotally supported at one end, a pilot valve operatively connected to the opposite end of said beam, the pilot valve adapted to develop a fluid control pressure, a fluid loading pressure responsive device actuated by the fluid control pressure of said pilot valve, said fluid loading pressure responsive device acting upon said beam at a point between its ends, a bell crank having one arm connected by yielding means to said beam at a point between its ends, system balancing mechanism including a cam engaging another arm of said bell crank for positioning the latter, and range changing means for adjustably changing the moment arm between the yielding means and the cam.

2. The mechanism of claim 1 in which said pressure responsive device acts upon said beam to swing it in one direction, and said yielding means opposes the swinging of the beam by the pressure responsive device.

3. A regulating mechanism, including in combination, a beam pivotally supported at one end, a pilot valve operatively connected to the opposite end of said beam, a pressure responsive device acting upon said beam for swinging the latter about its pivot from a predetermined position, means for supplying a loading pressure to said pressure responsive device, fluid actuated means for positioning a control element, said fluid actuated means having opposed pressure surfaces, separate passage means for delivering control pressures from said pilot valve to said pressure surfaces, a pivotally supported arcuate member, yielding means joining the beam to said arcuate member for opposing the effect of the pressure responsive device upon the beam, said yielding means adjustable on said arcuate member for changing the moment arm of the arcuate member relative to its pivot and effective upon the yielding means to change the range of control pressures from said pilot valve without changing the basic loading effect of the yielding means, and means connecting said fluid actuated means to said member for adjusting it to vary the tension of said yielding means, whereby said fluid actuated means is actuated by movement of said beam from said predetermined position to vary the tension of said yielding means so as to return the beam to said predetermined position.

4. The mechanism of claim 3 in which means including a manually adjustable valve member are provided for connecting one of said separate passage means selectively in communication with said pilot valve and with the other of said separate passage means.

5. A regulating mechanism including in combination, a beam pivotally supported at one end, a pilot valve operatively connected to the opposite end of said beam, a pressure responsive device acting upon said beam for swinging the latter about its pivot from a predetermined position, means for supplying a loading pressure to said pressure responsive device, fluid actuated means for positioning a control element, said fluid actuated means having opposed pressure surfaces, separate passage means for delivering control pressures from said pilot valve to said pressure surfaces, means including a manually adjustable valve member for connecting one of said passage means selectively in communication with said pilot valve and with the other of said separate passage means, a pivotally supported member, yielding means joining the beam to said member for opposing the effect of the pressure responsive device upon the beam, means for changing the moment arm of said member effective on the yielding means to change the range of the system without changing the basic loading effect of the yielding means, and means connecting said fluid actuated means to said member for adjusting its position to vary the tension of said yielding means, said fluid actuated means operating on movement of said beam from said predetermined position to vary the tension of said yielding means so as to return the beam to said predetermined position.

6. A regulating mechanism comprising, in combination, a beam pivotally supported at one end, a pilot valve operatively connected to the opposite end of said beam, separate passage means adapted to be oppositely connected to pressure fluid supply and exhaust by said pilot valve, fluid actuated means for positioning a control element, a passage means communicating with said fluid actuated means for conducting pressure fluid relative thereto, a manually adjustable valve member for connecting said last mentioned passage means selectively to said separate passage means, a pressure responsive device for swinging said beam about its pivot, means for supplying a loading pressure to said pressure responsive device, a pivotally supported member, yielding means connecting said beam to said member for opposing the swinging of the beam by said pressure responsive device, and means operatively connecting said fluid actuated means to said member for adjusting its position to vary the tension of said yielding means.

7. The mechanism of claim 6 in which said last mentioned means operates to vary the tension of said yielding means in proportion to changes in the loading pressure.

8. A regulating mechanism comprising, in combination, a beam pivotally supported at one end, a pilot valve operatively connected to the opposite end of said beam, a pressure responsive device acting upon said beam for swinging the latter about its pivot, a pivotally supported member, yielding means connecting said beam to said member for opposing the swinging of the beam by said pressure responsive device, means for adjusting the position of said member about its pivotal support, passage means for conducting pressure to a device to be controlled, and means for connecting said passage means and said pressure responsive device to said pilot valve.

9. The mechanism of claim 8 including separate passage means adapted to be oppositely connected to pressure fluid supply and exhaust by said pilot valve, and a manually adjustable valve for connecting the last mentioned passage means and said pressure responsive device selectively to said separate passage means.

10. A mechanism for regulating the position of a control element comprising, in combination, a cylinder having a piston reciprocable therein, means for pivotally supporting said cylinder at one end, a piston rod extending through the other end of said cylinder, a walking beam connected at one end to said piston rod, means for pivotally supporting said walking beam at a point between its ends, means connecting said walking beam to said control element, a pilot valve having separate ports at which pressures are established in response to changes in a variable condition, the pressure at one of said ports varying directly with changes in the condition and the pressure at the other of said ports varying inversely with changes in the condition, means for connecting the opposite ends of said cylinder selectively to said ports and in communication with each other, manually operable means connected to said walking beam for actuating it when the ends of said cylinder are connected together, a rod connected to the end of said walking beam opposite from said piston rod and extending through a pivotally supported housing, and releasable means in said housing for locking said last mentioned rod against longitudinal movement.

11. The mechanism of claim 10 in which said releasable locking means includes plate members pivotally supported at one end and having openings through which said last mentioned rod extends, means for yieldingly urging the other ends of said plate members toward each other, and manually operable means engageable with said plate members for moving the latter apart into released positions.

12. The mechanism of claim 10 in which said releasable locking means includes, a housing, openings in said housing through which said rod extends, plate members loosely received at one end in openings in one side of said housing and having openings through which said rod extends, means for yieldingly urging the other ends of said plate members toward each other, a cam arranged between said plate members for moving the latter apart against the action of said yielding means, and a manually operable means for actuating said cam.

13. A mechanism for regulating the position of a control element including, in combination, a cylinder having a piston reciprocable therein, means for pivotally supporting said cylinder at one end, a piston rod extending through the other end of said cylinder, a walking beam connected at one end to said piston rod, means for pivotally supporting said walking beam at a point between its ends, means connecting said walking beam to said control element, a pilot valve having separate ports at which control pressures are established in response to changes in a variable condition, the pressure at one of said ports varying directly with changes in the condition and the pressure at the other of said ports varying inversely with changes in the condition, means for connecting the opposite ends of said cylinder selectively to said ports and in communication with each other, manually operable means connected to said walking beam for actuating it when pressures are equalized across the cylinder by connecting the ends together, a bar movable longitudinally by and with the walking beam, a clamping means for the bar supported against movement with the bar, the bar arranged to normally freely move through the clamping means as the piston moves in the cylinder, and hand actuable means for moving said clamp against said bar thereby locking the walking beam against movement.

14. The mechanism of claim 13 wherein the bar is longitudinally slotted, and an elongated rod rotatably supported in a plane normal to the plane of the slot and passing through the slot to thereby guide the reciprocal movements of said slotted bar, one end of said rod threaded into said clamping means and the other end of the rod provided with a crank whereby angular movement of the crank threads the rod into the clamp tightening it against the slotted rod to lock it against movement.

15. A regulating mechanism including, in combination, a force-balance beam, a pilot valve operated by departure of the beam from a predetermined force-balance position to establish a fluid loading pressure representative of the extent of unbalance, a fluid loading pressure responsive device responsive to the fluid loading pressure of said pilot valve, said fluid loading pressure responsive device acting upon the beam in one direction, a spring loading the beam in opposition to said device, system balancing mechanism including a characterizing cam varying the effective loading of the spring, and range changing means selectively changing the moment arm between the spring and the cam.

16. The mechanism of claim 15 wherein the range changing means provides for changing the said moment arm without change in basic spring tension.

References Cited in the file of this patent

UNITED STATES PATENTS

| Number | Name | Date |
|--------|------|------|
| 497,168 | Cronan | May 9, 1893 |
| 782,412 | Neudorff | Feb. 14, 1905 |
| 924,853 | Sweetland | June 15, 1909 |
| 1,666,270 | Soderberg | Apr. 17, 1928 |
| 1,908,396 | Albright | May 9, 1933 |
| 2,073,838 | Hammond | Mar. 16, 1937 |
| 2,124,274 | Nichols | July 19, 1938 |
| 2,209,418 | Overbeke | July 30, 1940 |
| 2,311,853 | Moore | Feb. 23, 1943 |
| 2,339,469 | Emanuel | Jan. 18, 1944 |
| 2,360,889 | Philbrick | Oct. 24, 1944 |
| 2,366,246 | Erbguth | Jan. 2, 1945 |
| 2,369,887 | Eckman | Feb. 20, 1945 |
| 2,408,685 | Rosenberger | Oct. 1, 1946 |
| 2,436,451 | Rosenberger | Feb. 24, 1948 |
| 2,454,946 | Rosenberger | Nov. 30, 1948 |